United States Patent [19]

Scherbatskoy

[11] Patent Number: 5,079,750

[45] Date of Patent: Jan. 7, 1992

[54] METHOD AND APPARATUS FOR TRANSMITTING INFORMATION IN A BOREHOLE EMPLOYING DISCRIMINATION

[76] Inventor: Serge A. Scherbatskoy, 3921 Clayton Rd. East, Fort Worth, Tex. 76116

[21] Appl. No.: 537,913

[22] Filed: Jun. 13, 1990

Related U.S. Application Data

[60] Continuation-in-part of Ser. No. 275,706, Nov. 22, 1988, which is a continuation of Ser. No. 140,960, Jan. 5, 1988, abandoned, which is a continuation of Ser. No. 75,686, Jul. 20, 1987, abandoned, which is a continuation of Ser. No. 924,046, Oct. 28, 1986, abandoned, which is a continuation of Ser. No. 811,952, Dec. 20, 1985, abandoned, which is a continuation of Ser. No. 718,895, Apr. 2, 1985, abandoned, which is a continuation of Ser. No. 443,138, Nov. 19, 1982, abandoned, division of Ser. No. 383,269, May 28, 1982, Pat. No. 4,520,468, which is a continuation of Ser. No. 68,526, Aug. 21, 1979, abandoned, continuation-in-part of Ser. No. 857,677, Dec. 5, 1977, abandoned.

[51] Int. Cl.⁵ ............................................. G01V 1/40
[52] U.S. Cl. ................................. 367/85; 367/83
[58] Field of Search ......................... 367/83, 84, 85

[56] References Cited

U.S. PATENT DOCUMENTS

| | | | |
|---|---|---|---|
| 3,736,558 | 5/1973 | Cubberly, Jr. | 367/85 |
| 3,737,843 | 6/1973 | Le Peuvedic et al. | 367/85 |
| 3,964,556 | 6/1976 | Gearhart et al. | 175/45 |
| 4,027,282 | 5/1977 | Jeter | 367/85 |
| 4,078,620 | 5/1978 | Westlake et al. | 367/85 |
| 4,771,408 | 9/1988 | Kotlyar | 367/83 |

Primary Examiner—Ian J. Lobo
Attorney, Agent, or Firm—Head & Johnson

[57] ABSTRACT

An apparatus for transmitting data to the surface of the earth in a borehole having a tubular drill string for circulating drilling fluid between the surface of the earth and downhole including a signal generator for providing electrical signals indicating a measured downhole condition, a valve within the apparatus moveable between a closed and an open condition for controlling, at least in part, the flow of drilling fluid, the valve being moved from closed toward open condition by the application of a first force, such as of a solenoid, and sequentially by a second force, such as a hydraulic fluid pressure differential across a piston to rapidly move the valve to the open condition, thereby creating a negative pressure pulse in the drilling fluid which pressure pulse is receivable at the earth's surface. In the preferred arrangement the fluid passageway within the apparatus includes an orifice for creating a lower pressure zone, the pressure of this zone being utilized to create a differential pressure across a piston to supply the secondary force for moving the valve towards the open condition.

9 Claims, 8 Drawing Sheets

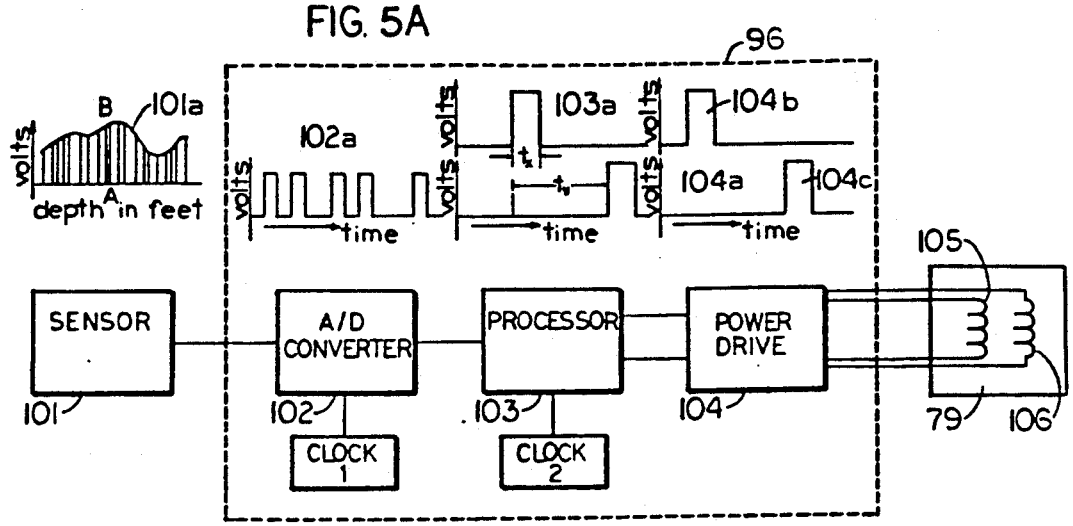
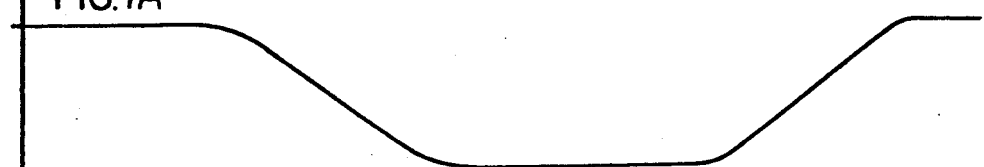
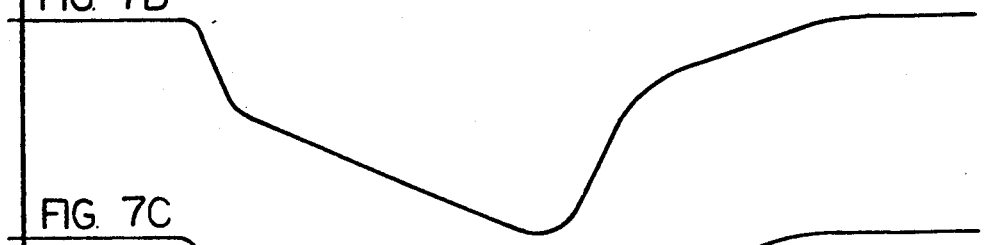
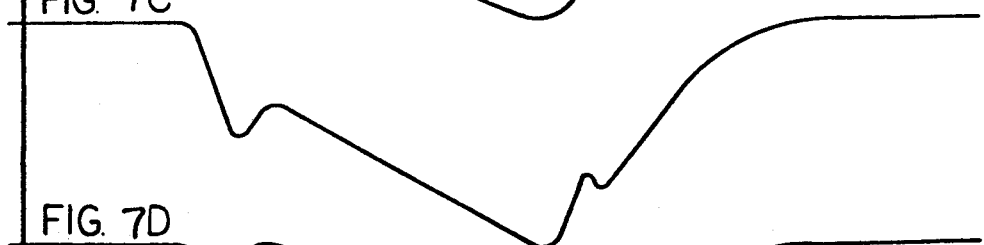

PUMP NOT RUNNING

SPRINGS NOT SHOWN

PUMP STARTS

PUMP RUNNING

METHOD AND APPARATUS FOR TRANSMITTING INFORMATION IN A BOREHOLE EMPLOYING DISCRIMINATION

CROSS-REFERENCE TO RELATED APPLICATIONS

This application is a continuation-in-part of co-pending application Ser. No. 07/275,706 filed by Serge A. Scherbatskoy on Nov. 22, 1988, which is a continuation of application Ser. No. 07/140,960 filed Jan. 5, 1988, now abandoned, which is a continuation of application Ser. No. 07/075,686, filed on Jul. 20, 1987, now abandoned, which is a continuation of application Ser. No. 06/924,046 filed on Oct. 28, 1986, now abandoned, which is a continuation of application Ser. No. 06/811,952 filed on Dec. 20, 1985, now abandoned, which is a continuation of application Ser. No. 06/718,895 filed on Apr. 2, 1985, now abandoned, which is a continuation of application 06/443,138 filed on Nov. 19, 1982 Pat. No., which is a divisional of application Ser. No. 06/383,269 filed May 28, 1982, Pat. No. 4,520,468, which is a continuation of application Ser. No. 06/068,526 filed Aug. 21, 1979, now abandoned, which is a continuation-in-part of application Ser. No. 05/857,677 filed Dec. 5, 1977, now abandoned.

FIELD OF THE INVENTION

This invention generally pertain to measurements while drilling a bore hole in the earth and more particularly pertains to systems, apparatus, and methods utilizing hydraulic shock waves in the drilling mud column for transmission of signals representing one or more downhole parameters to the earth's surface. It also pertains to systems and methods for detecting those signals in the presence of interfering noise.

DESCRIPTION OF THE PRIOR ART

This invention relates to data transmission systems for use in transmitting data from the bottom of a well bore to the surface while drilling the well.

It has been long recognized in the oil industry that the obtaining of data from downhole during the drilling of a well would provide valuable information which would be of interest to the drilling operator. Such information as the true weight on the bit, the inclination and bearing of the borehole, the tool face, fluid pressure, and temperature at the bottom of the hole and the radioactivity of substances surrounding or being encountered by the drill bit would all be expressed by quantities of interest to the drilling operator. A number of prior art proposals to measure these quantities while drilling and to transmit these quantities to the surface of the earth have been made. Various transmission schemes have been proposed in the prior art for so doing. For a description of prior art see for instance U.S. Pat. No. 2,787,795 issued to J. J. Arps, U.S. Pat. No. 2,887,298 issued to H. D. Hampton, U.S. Pat. No. 4,078,620 issued to J. H. Westlake et al, U.S. Pat. No. 4,001,773 issued to A. E. Lamel et al, U.S. Pat. No. 3,964,556 issued to Marvin Gearhart et al, U.S. Pat. No. 3,983,948 issued to J. D. Jeter, and U.S. Pat. No. 3,791,043 issued to M. K. Russell. All of the above listed patents are incorporated in this specification by reference.

Perhaps the most promising of these prior art proposals a in a practical sense has been that of signalling by pressure pulses in the drilling fluid. Various methods have been suggested in the prior art to produce such mud pulsations either by a controlled restriction of the mud flow circuit by a flow restricting valve appropriately positioned in the main mud stream or by means of a bypass valve interposed between the inside of the drill string (high pressure side) and the annulus around the drill string (low pressure side).

It has been suggested in the prior art to produce mud pressure pulses by means of valves that would either restrict the mud flow inside the drill string or bypass some flow to the low pressure zone in the annulus around the drill string. Such valves are of necessity slow because when used inside the drill string the valve must control very large mud volumes, and when used to control a by-pass, because of the very high pressure differences, the valve was of necessity also a slow motorized valve. For example, such a motorized valve, interposed between the inside of the drill string and the annulus produced in response to a subsurface measurement slow decreases and slow increases of mud pressure. These were subsequently detected at the surface of the earth.

In order to understand more fully the operation of a slowly acting motorized valve as suggested in the prior art, reference is made to FIG. 1A which shows the opening and the closing of such a valve as a function of time. Referring now specifically to FIG. 1A, the abscissas in FIG. 1A represents time, t, whereas the ordinates represent the degree of opening of the valve, R.

$$R = S(t)/S_0 \tag{1}$$

where $S_0$ is the total area of the opening and $S(t)$ is the area which is open at the instant t during the process of opening or closing of the valve. Thus when $R=0$ the valve was closed and when $R=1$ the valve was fully opened. The times involved in the operation of the valve were as follows:

$t_a^{(v)} = OA_1$ was the time at which the valve started to open:

$t_b^{(v)} = OB_1$ was the time at which the valve was fully open;

$t_c^{(v)} = OC_1$ was the time at which the valve started to close;

$t_d^{(v)} = OD_1$ was the time at which the valve was fully closed.

The time interval:

$$T_a^{(v)} = t_b^{(v)} - t_a^{(v)} = t_d^{(v)} - t_c^{(v)} \tag{2}$$

$T_a^{(v)}$ will be referred to as the "time of opening or closing of the valve". The time interval $$T_b^{(v)} = t_c^{(v)} - t_b^{(v)} \tag{3}$$

$T_b^{(v)}$ will be referred to as the "time of open flow". Thus, the total period of the actuation of the valve was $$T_b^{(v)} = 2T_a^{(v)} + T_b^{(v)} \tag{4}$$

In the above attempts one had $T_a^{(v)} = 1$ second, $T_b^{(v)} = 2$ seconds and consequently the total time of the actuation of the valve was $T_t^{(v)} = 4$ seconds. These relatively slow openings and closings of the valve produced correspondingly slow decreases and increases of mud pressure at the surface of the earth (see FIG. 1B).

It can be seen that the mud pressure decreased from its normal value of for example, 1000 psi (when the valve was closed) to its lowest value of 750 psi (when the valve was open). The times involved in these observed pressure variations were as follows:

$t_{1a}^{(s)} = OE_1$ was the time at which the mud pressure starts to decrease from its normal level at 1000 psi;

$t_{1b}^{(s)} = OF_1$ was the time at which the mud pressure attained its lowest level at 750 psi and was maintained at this level until time $t_{1c}^{(s)} = OG_1$;

$t_{1c}^{(s)} = OG_1$ was the time at which the mud pressure starts to increase;

$t_{1d}^{(s)} = OH_1$ was the time at which the mud pressure attained its normal level at 1000 psi.

Thus, the pressure decreased during the time interval $T_1^{(s)} = t_{1b}^{(s)} - t_{1a}^{(s)}$, then it remained constant during the interval $T_2^{(s)} = t_{1c}^{(s)} - t_{1b}^{(s)}$, and then it rose from its depressed value to the normal level during the time interval $T_3^{(s)} = t_{1d}^{(s)} - t_{1c}^{(s)}$. Thus, the total time of the mud flow through the bypass valve for a single actuation of the valve was $$T_t^{(s)} = T_a^{(s)} + T_2^{(s)} + T_3^{(s)} \quad (5)$$

I have designated quantities in FIG. 1A (such as $t_a^{(v)}$, $t_b^{(v)}$, $t_c^{(v)}$, $t_d^{(v)}$, $T_a^{(v)}$, $T_b^{(v)}$ and $T_t^{(v)}$ with superscript "v" to indicate that these quantities relate to the operation of the valve which is below the surface of the earth. On the other hand the quantities $t_{1a}^{(s)}$, $t_{1b}^{(s)}$, $t_{1c}^{(s)}$, $t_{1d}^{(s)}$, $T_1^{(s)}$, $T_2^{(s)}$, $T_3^{(s)}$ and $T_t^{(s)}$ in FIG. 1B are designated with superscript "s" to indicate that these quantities relate to measurements at the surface of the earth. This distinction between the quantities provided with superscript "v" and those with superscript "s" is essential in order to fully understand some of the novel features of my invention. It is essential in this connection to distinguish between the cause and the effect, or in other words, between the phenomena occurring downhole, in the proximity of the valve and those at the detector at the surface of the earth.

An essential feature of the previously proposed arrangement is based on the relationships:

$$T_1^{(s)} = T_a^{(v)} \quad (6)$$

$$T_2^{(s)} = T_b^{(v)} \quad (7)$$

$$T_3^{(s)} = T_a^{(v)} \quad (8)$$

These relationships show that the period of decrease or increase of the pressure at the earth's surface was the same as the corresponding period of opening and closing of the valve, and the period at which the pressure was substantially constant (at a decreased level) was the same as the period during which the valve was fully open. In other words, the decrease and subsequent increase of the mud pressure at the earth's surface was in exact correspondence with the opening and closing of the valve. This condition as expressed by the relationships (6), (7), and (8) will be referred to in this specification as relating to a "regime of slow variations of pressure".

The regime of slow pressure variation as suggested in the prior art was not suitable for telemetering in measurement while drilling operations, particularly when several down hole parameters are being measured. By the time a first parameter has been measured, encoded, transmitted to the surface and then decoded, the well bore can have been deepened and the second parameter may no longer be available for measurement. Relatively long time intervals were required for the conversion of the measured data into a form suitable for detection and recording. The entire logging process was lengthy and time consuming. Furthermore various interfering effects such as pulsations due to the mud pump and noise associated with various drilling operations produced additional difficulty. A slow acting motorized valve, such as that suggested in the prior art, is believed to be inadequate to satisfy current commercial requirements.

SUMMARY OF THE INVENTION

Some of the objectives of my invention are accomplished by using hydraulic shock waves for telemetering logging information while drilling is in process. These shock waves are produced by a very rapidly acting (for all practical purposes almost instantaneously acting) bypass valve interposed between the inside of the drill string and the annulus around the drill string. When the bypass valve suddenly opens, the pressure in the immediate vicinity of the valve drops and then returns to normal almost instantaneously and a sharp negative pulse is generated, and conversely, when the bypass valve suddenly closes, a sharp positive pulse is generated. Elasticity of mud column is employed to assist in the generation and transmission of such shock waves. The phenomenon is analogous to the well known water hammer effect previously encountered in hydraulic transmission systems. (See for instance John Parmakian on "Water Hammer Analysis", Prentice Hall, Inc., New York, N.Y. 1955 or V. L. Streeter and E. B. Wylie on "Hydraulic Transients" McGraw-Hill Book Co., New York, N.Y.)

Significant features of my invention such as the generation and detection of hydraulic shock waves are shown schematically in FIGS. 2A and 2B. The graph in FIG. 2A shows the openings and closings of a fast acting shock wave producing valve, whereas the graph of FIG. 2B shows pressure variations detected at the earth's surface and resulting from the operation of the valve as in FIG. 2A. Symbols such as $A_1$, $B_1$, $C_1$, $D_1$, $t_a^{(v)}$, $t_b^{(v)}$, $t_c^{(v)}$, $t_d^{(v)}$, $T_a^{(v)}$, $T_b^{(v)}$ and $T_t^{(v)}$ in FIG. 2A have a similar meaning as the corresponding symbols in FIG. 1A. However, the time scales in FIGS. 1A, 1B, 2A and 2B have been considerably distorted in order to facilitate description, and in the interest of clarity of explanation.

The first thing which should be noted in examining FIG. 2A is that the times of opening and closing of the valve in accordance with my invention are by several orders of magnitudes shorter than the corresponding times obtained by means of the motorized valve as reported in connection with FIG. 1A. In the arrangement previously suggested (as in FIG. 1A) one had $T_a^{(v)} = 1$ second whereas in accordance with my invention as in FIG. 2A one has $T_a^{(v)} = 5$ milliseconds. A similar situation applies to the time interval during which a value remains open. In the arrangement previously suggested (as in FIG. 1A) one had $T_b^{(v)} = 2$ seconds whereas in FIG. 2A one has $T_b^{(v)} = 100$ milliseconds. Thus, for all practical purposes, the openings and closings of the valve in FIG. 2A may be considered as instantaneous or almost instantaneous.

Rapid and almost instantaneous openings and closings of the valve have an important and far reaching influence on the performance of a telemetering system in a measuring while drilling operation. The pressure variations detected at the earth's surface in accordance with my invention (FIG. 2B) show no similarity whatever to the pressure variations obtained by means of a slow acting valve (FIG. 1B). I have previously pointed out the existence of equations (6), (7), and (8) which show relationships between the events illustrated in FIG. 1A and those illustrated in FIG. 1B. Analogous relationships do not exist between the events in FIG. 2A and 2B.

As shown in FIGS. 1A and 1B, the opening of the valve produced a corresponding decrease in the mud pressure at the surface of the earth, and conversely, the closing of the valve produced a corresponding increase in pressure.

For the sake of emphasis I wish to repeat that in the prior art the opening of the valve produced a single event namely a decrease in pressure and the subsequent closing of the valve produced another single event—an increase in pressure. On the other hand in my invention the fast opening of the valve as in FIG. 2A produces two events: a rapid decrease and subsequent increase in pressure (negative pulse "M" as in FIG. 2B). This is in contrast to the case shown in FIG. 1A and FIG. 1B where an opening and a subsequent closing of the valve is required in order to produce a decrease and a subsequent increase in pressure. Furthermore, the fast closing of the valve as in FIG. 2A produces an increase and a subsequent decrease of the mud pressure (positive pulse "N" as in FIG. 2B). Such an increase and subsequent decrease in pressure does not occur in the arrangements suggested in the prior art. In my invention, there are two shock waves produced by a single operation of the valve. A wave form such as shown in FIG. 2B, which comprises both a negative and a positive pulse, will be referred to in this specification as a "valve wavelet". Pressure pulses associated with a valve wavelet have an onset rate of several thousand psi/sec. and are of short duration.

It is of interest to point out the rapidity of the phenomena associated with the observed valve wavelets. The times involved in FIG. 2B are as follows:

$t_1^{(s)} = OK$ is the time of appearance of the negative pulse "M";

$t_2^{(s)} = OL$ is the time at which the negative pulse "M" decayed;

$t_3^{(s)} = OM$ is the time of appearance of the positive pulse "N";

$t_4^{(s)} = ON$ is the time at which the positive pulse "N" decayed.

The time interval $T_n^{(s)}$ representing the "length" of the negative pulse "M' (or the positive pulse "N") is 100 milliseconds, whereas the time interval $T_m^{(s)}$ from the appearance of the negative pulse "M" to the appearance of the positive pulse "N" is 110 milliseconds. Thus, the total period of flow as shown in FIG. 2B; i.e., $$T_u^{(s)} = T_n^{(s)} + T_m^{(s)} \quad (9)$$

is 210 milliseconds whereas the total period of flow as shown in FIG. 1B (see equation 5) was $T_t^{(s)} = 4$ seconds.

The graphs in FIGS. 1A, 1B, 2A, and 2B have been simplified and idealized by eliminating ripples and other extraneous effects. It should also be noted (see FIG. 2B) that the bypass valve is at least partially open during the time interval from $t_1^{(s)}$ to $t_4^{(s)}$. During this time interval, there is a slow pressure decline which is eliminated at the detection point by an appropriate filter. Such a pressure decline is not shown in the graph of FIG. 2B.

It should also be pointed out that the numerical values attached to FIG. 2A and 2B are given merely as an example. These values should not be interpreted as restricting my invention to any particular example given.

The process as explained in connection with FIGS. 2A and 2B will be referred to as relating to a "regime of hydraulic shock waves". Thus, a distinction is made between the regime of hydraulic shock waves as in FIG. 2A and 2B and the regime of slow variations of pressure as in FIG. 1A and 1B.

By providing a regime of hydraulic shock waves, I obtained a telemetering system by means of which large amounts of information can be transmitted per unit of time. Such a system is considerably better adapted to satisfy current commercial requirements than the one which is based on the regime of slow variations of pressure.

The valve, in accordance with my invention, is operated by the output of one or more sensors for sensing one or more downhole parameters in the earth's subsurface near the drill bit. One single measurement of each parameter is represented, by a succession of valve wavelets. Each valve wavelet corresponds to a single opening and closing of the valve.

The succession of valve wavelets (which represents the useful signal) when detected at the earth's surface is usually mixed with various interfering signals such as those produced by the operation of the pump and by other drilling operations. In a typical drilling arrangement, a large pump located at the surface is used to pump drilling mud down the drill stem through the bit and back to the surface by way of annulus between the drill pipe and the well bore. The interfering effects due to the pump are eliminated in this invention by a process which takes into account the periodicity of these effects. Other effects associated with drilling operations usually appear as noise signal comprising a relatively wide frequency spectrum. This noise signal is in some instances white noise and in other instances it departs considerably from white noise. A digital filtering system which may be a matched filter or a pulse shaping filter or a spiking filter is employed to remove the noise signal. The matched filter maximizes the signal to noise ratio at the reception point, a pulse shaping filter minimizes the mean square difference between a desired output and the actual output, whereas a spiking filter transforms the useful signal by contracting it into one which is sufficiently sharp so that it can be distinguished against a background noise. A special technique is applied to adapting these filters to the objectives of this invention. Such a technique requires storage and subsequent reproduction of two reference signals. The first reference signal is a wavelet produced by the opening and closing of the valve and the second reference signal represents noise due to the drilling operations. Detection and storage of the first reference signal is obtained by removing the weight on the bit and stopping the actual drilling (but maintaining the mud pumps in normal action). Thus, a signal is obtained which is free from the ambient noise. Detection and storage of the second reference signal is obtained when drilling is in progress during a period of time when the valve is closed. An appropriate digital computing system is arranged to receive the data representing one or both of these reference signals, and derives from the data a memory function for the matched filter, for the pulse shaping filter, or for the spiking filter.

One aspect of my invention pertains to improvements involving the bi-stable action of valve assembly 40 of the special telemetry tool 50. Another aspect of my invention concerns the provision of a special hydraulically operated mechanical arrangement that will periodically positively move the valve 40 to the closed position. In addition there is provided an electric system that will inhibit operation of the valve 40 in case of an electrical failure in the downhole apparatus.

Further aspects of my invention concern improvements involving the power supply 95 and the power drive 104 of the special telemetry tool 50. Such improvements serve to greatly increase the number of satisfactory valve actuations attainable without downhole battery recharge or replacement.

Another aspect of my invention concerns improvements in pulse time codes wherein only short pulses of substantially constant duration are transmitted, and the time intervals between successive pulse are the measures of the magnitude of the relevant parameter. In addition there is disclosed a system for improving the precision and accuracy in the transmission and detection of mud pressure pulses generated at the downhole equipment, which system involves the generation at the downhole equipment and the transmission of a group of at least 3 unequally spaced mud pressure pulses for each information carrying single pulse, and the provision of appropriate equipment at the surface for detecting and translating the transmitted pulse groups.

The novel features of my invention are set forth with particularity in the appended claims. The invention both as to its organization and manner of operation with further objectives and advantages thereof, may best be presented by way of illustration and examples of embodiments thereof when taken in conjunction with the accompanying drawings.

BRIEF DESCRIPTION OF DRAWINGS

FIG. 1A shows schematically the operation of a slow acting valve as was suggested in the prior art. FIG. 1B shows schematically pressure variations detected at the earth's surface and resulting from the operation of the valve as shown in FIG. 1A. Both FIGS. 1A and 1B describe a condition referred to in this specification as a "regime of slow variations of pressure";

FIG. 2A shows schematically the operation of a fast acting valve in accordance with my invention.

FIG. 2B shows schematically pressure variations detected at the earth's surface and resulting from the operation of the valve as shown in FIG. 2A. Both FIGS. 2A and 2B describe a condition referred to in this specification as a "regime of hydraulic shock waves".

FIG. 5A shows, schematically and more in detail, the electronic processing assembly comprised within the dotted rectangle in FIG. 4A.

FIGS. 7A to 7E show graphs representing variations of pressure as measured at the earth's surface and corresponding to various values of $T_a{}^{(v)}$ (times of opening or closing of a valve) and of $T_b{}^{(v)}$ (time of open flow). Graphs in these figures show results of certain tests which I perform in order to obtain the optimum condition for a regime of hydraulic shock waves. More specifically FIGS. 7A to 7E can be described as follows:

FIG. 7A corresponds to $T_a{}^{(v)}=1$ second and $T_b{}^{(v)}=2$ seconds,

FIG. 7B corresponds to $T_a{}^{(v)}=200$ milliseconds and $T_b{}^{(v)}=1$ second.

FIG. 7C corresponds to $T_a{}^{(v)}=60$ milliseconds and $T_b{}^{(v)}=0.5$ seconds.

FIG. 7D corresponds to $T_a{}^{(v)}=20$ milliseconds and $T_b{}^{(v)}=0.25$ seconds.

FIG. 7E corresponds to $T_a{}^{(v)}=5$ milliseconds and $T_b{}^{(v)}=10^{-1}$ seconds;

It should be noted that identical reference numerals have been applied to similar elements shown in some of the above figures. In such cases the description and functions of these elements will not be restated in so far as it is unnecessary to explain the operation of these embodiments.

DESCRIPTION OF THE PREFERRED EMBODIMENTS

I. General Description of Apparatus for Data Transmission While Drilling

Figure 3:
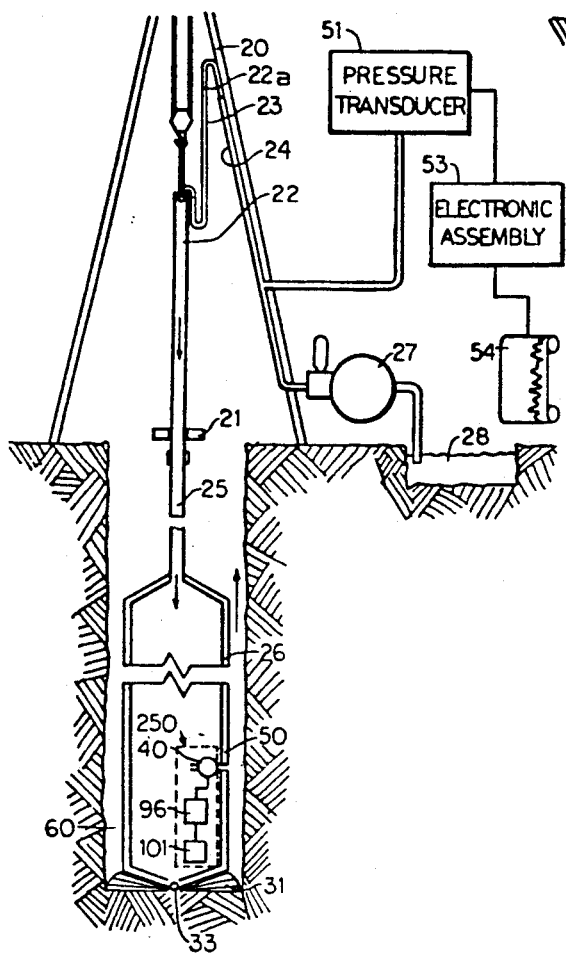
FIG. 3 schematically and generally illustrates a well drilling system equipped to simultaneously drill and to make measurements in accordance with some aspects my invention.

FIG. 3 illustrates a typical layout of a system embodying the principles of this invention. Numeral 20 indicates a standard oil well drilling derrick with a rotary table 21, a kelly 22, hose 23, and standpipe 24, drill pipe 25, and drill collar 26. A mud pump or pumps 27 and mud pit 28 are connected in a conventional manner and provide drilling and mud under pressure to the standpipe. The high pressure mud is pumped down the drill string through the drill pipe 25 and the standard drill collars 26 and then through the special telemetry tool 50 and to the drill bit 31. The drill bit 31 is provided with the usual drilling jet devices shown diagramatically by 33. The diameters of the collars 26 and the telemetry tool 50 have been shown large and out of proportion to those of the drill pipe 25 in order to more clearly illustrate the mechanisms. The drilling mud circulates downwardly through the drill string as shown by the arrows and then upwardly through the annulus between the drill pipe and the wall of the well bore. Upon reaching the surface, the mud is discharged back into the mud pit (by pipes not shown) where cuttings of rock and other well debris are allowed to settle and to be further filtered before the mud is again picked up and recirculated by the mud pump.

Interposed between the bit 33 and the drill collar 26 is the special telemetering transmitter assembly or telemetry tool designated by numeral 50. This special telemetering transmitter assembly 50 includes a housing 250 which contains a valve assembly, or simply a valve 40, an electronic processing assembly 96, and sensors 101. The valve 40 is designed to momentarily by-pass some of the mud from the inside of the drill collar into the annulus 60. Normally (when the valve 40 is closed) the drilling mud must all be driven through the jets 33, and consequently considerable mud pressure (of the order of 2000 to 3000 psi) is present at the standpipe 24. When the valve 40 is opened at the command of a sensor 101 and electronic processing assembly 96, some mud is bypassed, the total resistance to flow is momentarily decreased, the total resistance to flow is momentarily decreased, and a pressure change can be detected at the standpipe 24. The electronic processing assembly 96 generates a coded sequence of electric pulses representative of the parameter being measured by a selected sensor 101, and corresponding openings and closings of the valve 40 are produced with the consequent corresponding pressure pulses at the standpipe 24.

Numeral 51 designates a pressure transducer that generates electric voltage representative of the pressure changes in the standpipe 24. The signal representative of these pressure changes is processed by electronic assembly 53, which generates signals suitable for recording on recorder 54 or on any other display apparatus. The chart of recorder 54 is driven by a drive representative of the depth of the bit by means well known (not illustrated).

II. General Description of Special Telemetering Transmitter

Figure 4A:
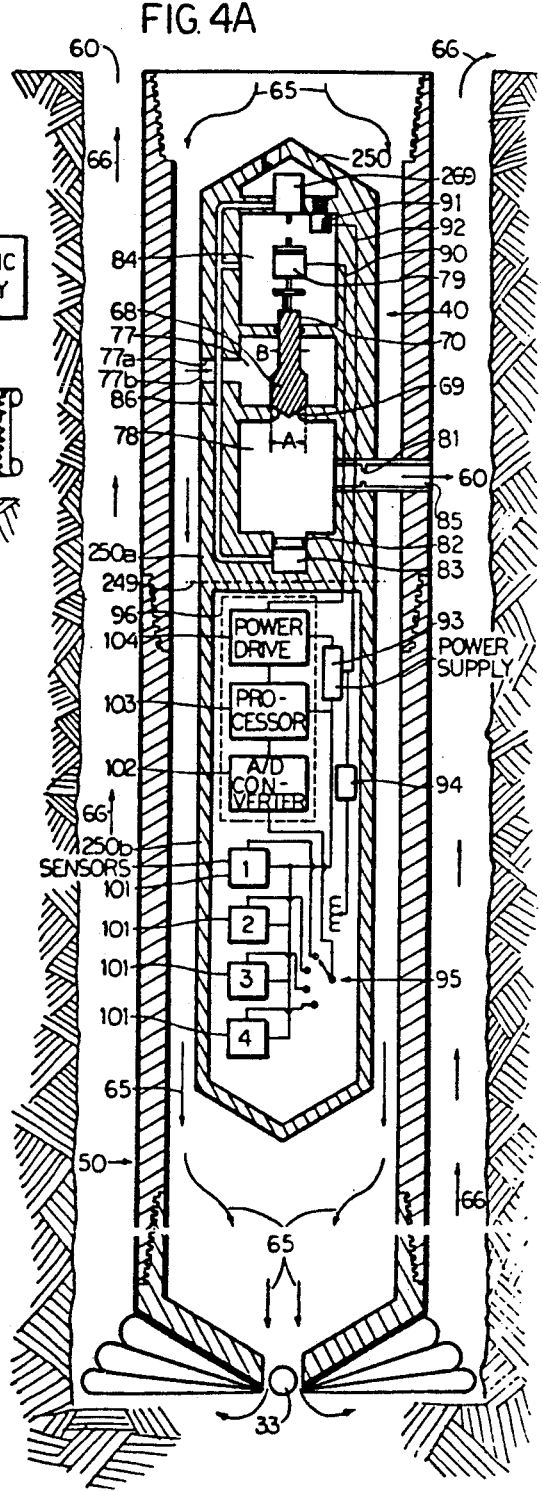
FIG. 4A shows schematically a portion of the subsurface equipment including a special telemetry tool in accordance with my invention.

FIG. 4A shows certain details of the special telemetering transmitter 50. Certain of these and other details have also been described in the above referred to copending application Ser. No. 857,677 filed by S. A. Scherbatskoy, of which this application is a continuation in part. FIG. 4A is diagrammatic in nature. In an actual tool, the housing 250, which contains the valve 40, the electronic processing assembly 96, and the sensor 101, is divided into two sections 250a and 250b. The upper portion 250a (above the dotted line 249) contains the valve assembly 40 and associated mechanisms and, as will be pointed out later in the specification, is of substantially larger diameter than 250b. The lower section 250b (below the dotted line 249) contains the electronic processing assembly 96, sensors 101, and associated mechanisms, and as will be explained later in the specification, has a substantially smaller diameter than the upper section 250a. As shown in FIG. 4A, the drilling mud circulates past the special telemetry tool 250a, 250b downwardly (as shown by the arrows 65) through the bit nozzle 33 and then back (as shown by the arrows 66) to the surface in annulus 60 and to the mud pit 28 by pipe means not shown. The valve assembly 40 comprises valve stem 68 and valve seat 69. The valve stem and seat are constructed in such manner that the cross sectional area of the closure A is slightly larger than the cross section area B of the compensating piston 70. Thus, when the pressure in chamber 77 is greater than that in the chamber 78, the valve stem 68 is forced downwardly; and the valve 40 tends to close itself more tightly as increased differential pressure is applied.

Double acting electromagnetic solenoid 79 is arranged to open or close valve 40 in response to electric current supplied by electric wire leads 90.

Let $P_{60}$ indicate the mud pressure in the annulus 60, $P_{77}$ the pressure in chamber 77, and $P_{78}$ the pressure in chamber 78. Then, when valve 40 is closed, one has $P_{78} = P_{60}$. When the pumps 27 are running and valve 40 is "closed", or nearly closed, and $P_{77} > P_{78}$ the valve stem 68 is urged towards the valve seat 69. When valve 40 is in the "open" condition (i.e., moved upwardly in the drawing) flow of mud from chamber 77 to the annulus 60 results; and because of the resistance to flow of the orifice C (FIG. 4B), one has the relationship $P_{77}$ $P_{78} > P_{60}$. Chambers 83 and 84 are filled with a very low viscosity oil (such as DOW CORNING 200 FLUID, preferably of viscosity 5 centistokes or less) and interconnected by passageway 86. Floating piston 82 causes the pressure $P_{83}$ in the oil filled chamber 83 to be equal at all times to $P_{78}$. Thus, at all times $P_{78} = P_{83} = P_{84}$. Therefore, when the valve 40 is "open", since $P_{78} = P_{84}$ and $P_{77} > P_{84}$, the valve 40 is urged towards the "open" position by a force F=(area B) $(P_{77} - P_{84})$. The valve 40 can therefore be termed bi-stable; i.e., when "open" it tends to remain "open" and when "closed" it tends to remain "closed". Furthermore, when nearly open it tends to travel to the open condition and when nearly closed, it tends to travel to the closed condition. The valve 40 can therefore be "flipped" from one state to the other with relatively little energy. The valve action can be considered the mechanical equivalent of the electric bi-stable flip-flop well known in the electronics art.

Figure 4B:
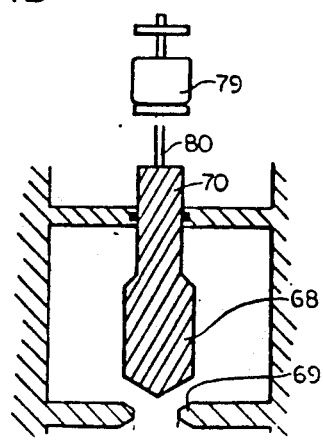
FIG. 4B shows schematically a portion of the arrangement of FIG. 4A.

FIG. 4B shows the valve 40 in the open condition; whereas, in FIG. 4A it is closed.

Referring again to FIG. 4A, numeral 91 indicates an electric "pressure switch" which is electrically conductive when $P_{77} > P_{78}$ (pump running) and electrically non-conductive when $P_{77} = P_{78}$ (pump shut down—not running). Wire 92 running from pressure switch 91 to power supply 93 can, therefore, turn the power on or off. Also, by means of electronic counter 94 and electromagnetic sequence switch 95, any one of the four sensors 101 can be operatively connected to the electronic processing assembly 96 by sequentially stopping and running the mud pumps 27 or by stopping then running the pumps in accordance with a predetermined code that can be interpreted by circuitry in element 94.

Figure 4C:
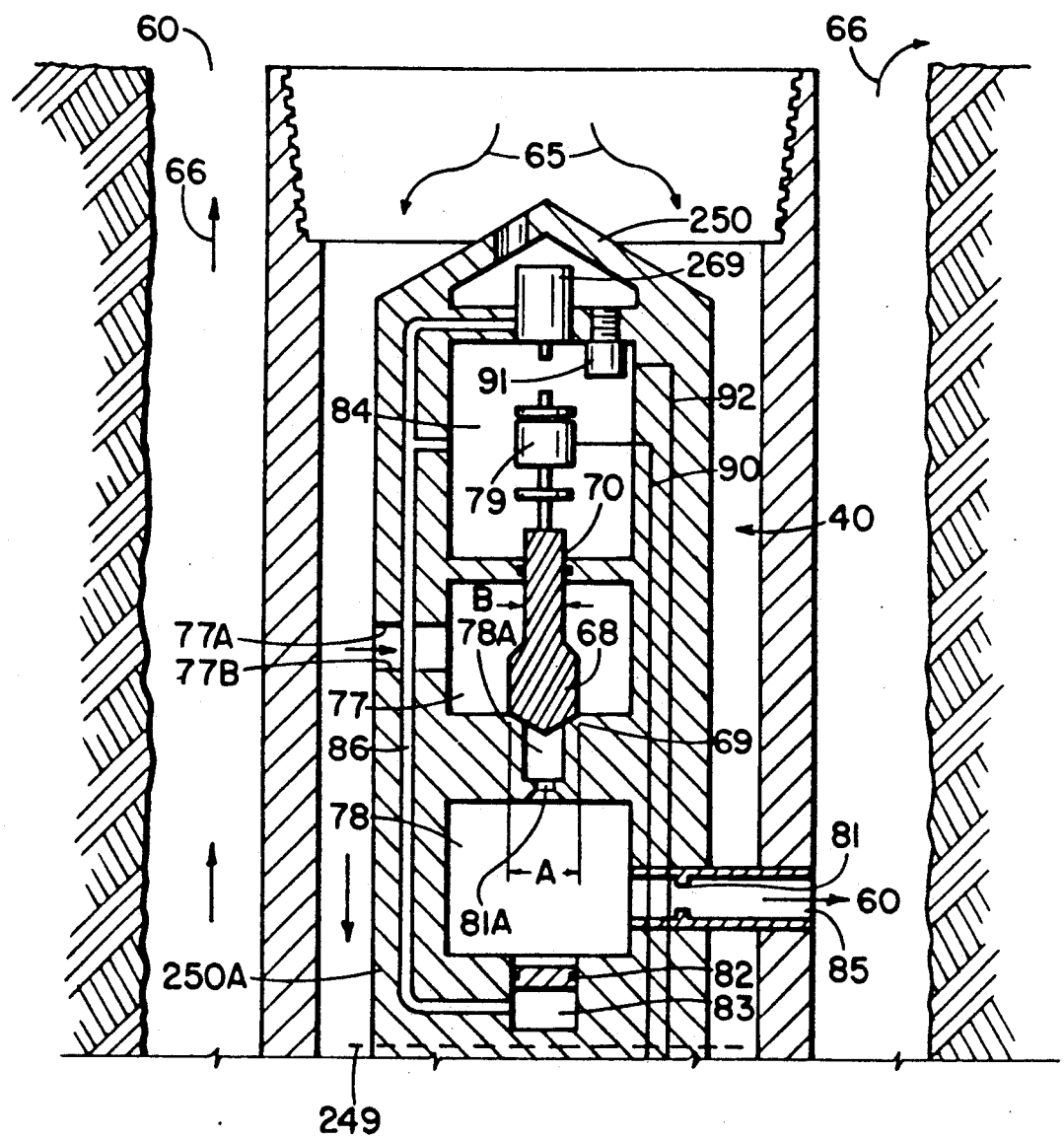
FIG. 4C shows an alternate embodiment of the upper portion of FIG. 4A. The alternate embodiment shown is a schematic of a portion of the special telemetry tool having dual orifices in the fluid flow passageway between the valve and the well.
Figure 4D:
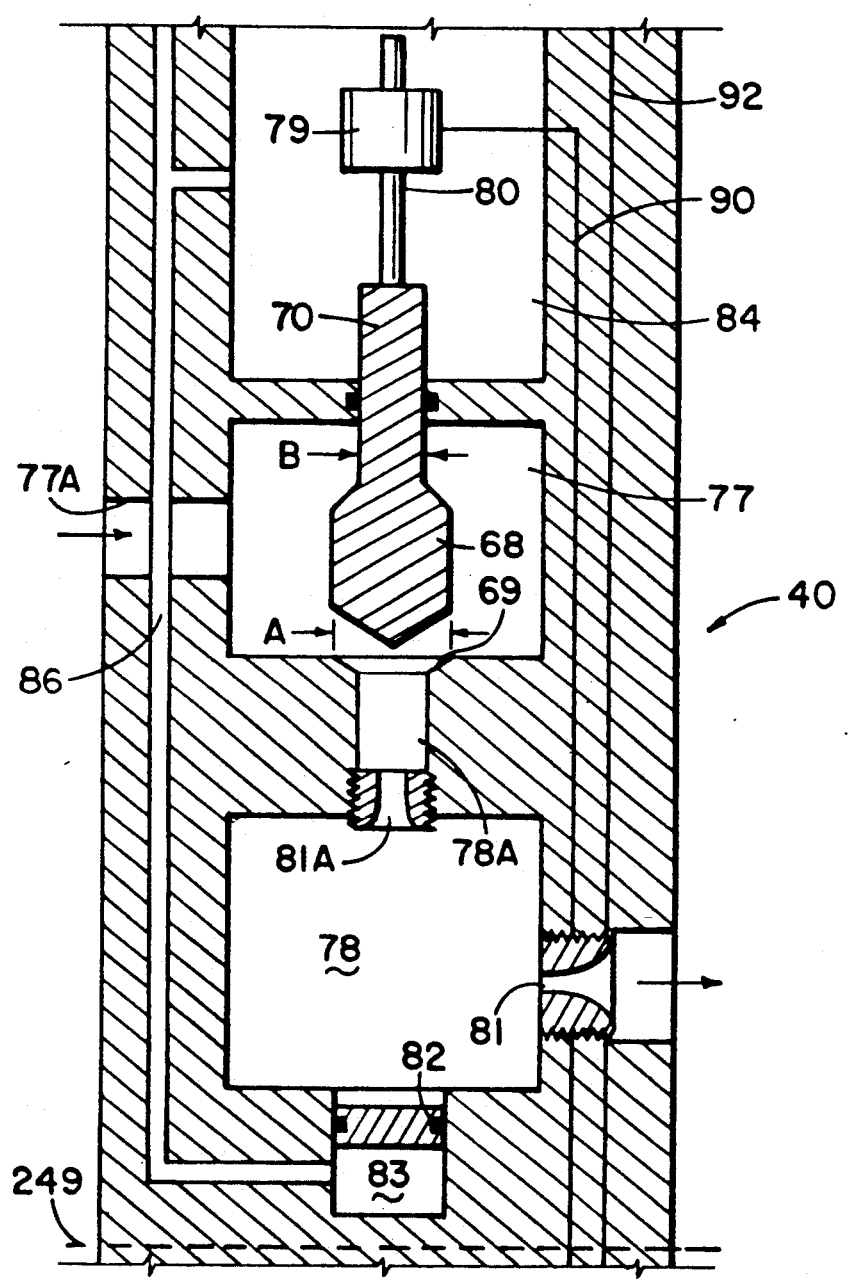
FIG. 4D shows an alternate embodiment of FIG. 4B in which the schematic portion of the special telemetry tool has a dual orifice arrangement.

FIGS. 4C and 4D add to the above described tool an orifice 81A interposed between valve seat 69 and chamber 78 providing a sub-chamber 78A.

The pressure in chamber 78, when the valve is open, is lower than the pressure in chamber 77, and by selective use of the diameter of orifice 81A, the differential pressure is controllable. This differential pressure is applied by piston 82 to chamber 83 and passageway 86 to chamber 84. Thus, the differential pressure is applied to the upper and lower portion of valve 70, thereby tending to move the valve towards the fully open position, or if the valve when the valve is fully open, to positively keep the valve in the open position.

Therefore, the addition of the second, or dual orifice 81A provides for more positive opening of the valve.

Because of the wide range of viscosities, weights and pressures that are encountered in oil well drilling it is necessary to balance the flow restrictive effects of the orifices 81 and 81A since it is then that determine the pressure in chamber 78. In order to make it convenient to change the effects of the restrictors 81 and 81A tungsten carbide inserts can be used as shown in FIG. 4D. These inserts can be, for example, rotary bit nozzles as manufactured by Dresser Industries of Dallas, Tex. The diameters of these inserts are closely controlled and are measured in 1/32 of an inch thus nozzle No. 5 has an internal diameter of 5/32".

Because of the hydraulic forces generated by the actions of the valve arrangement shown in FIG. 4C and FIG. 4D very rapid opening and closing of the valve can be accomplished and can be made sufficiently rapid to cause the generation of hydraulic shock waves as described in this specification.

The fluid (mud) pressure in chamber 77 is at all times substantially equal to the fluid (mud) pressure inside the drill collar, designated as 26 in FIG. 3 because of the opening 77a in the wall of the housing 250. A fluid solid particles and debris from entering chamber 77. When the valve 40 is closed, the fluid (mud) pressure in chamber 78 is equal to the fluid (mud) pressure in the annulus 60. When the valve 40 is open and the pumps are running mud flow occurs from chamber 77 to chamber 78 and through orifice 81 to the annulus 60 with corresponding pressure drops.

III. Description of Electronic Processing Assembly Portion of Special Telemetry Tool We have described the operation of the bi-stable valve 40 and the sequence switch 95 which makes the selected electrical connection of the various sensors 101 to the electronic processing assembly 96.

Figure 5B:
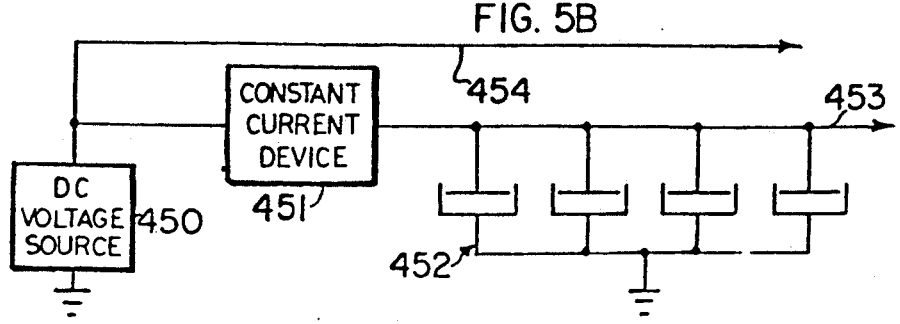
FIG. 5B shows schematically a power supply including a capacitor charging and discharging arrangement for providing the required power and energy for actuating the valve of the special telemetry tool.

For further details of the electronic processing assembly 96 reference is made to FIG. 5A, where like numbers refer to like numbers of FIG. 4A.

Various types of sensors that generate electric signals indicative of a downhole parameter are well known. Examples are gamma ray sensors, temperature sensors, pressure sensors, gas content sensors, magnetic compasses, strain gauge inclinometers, magnetometers, gyro compasses, and many others. For the illustrative example of FIG. 5A, I have chosen a gamma ray sensor such as an ionization chamber or geiger counter or scintillation counter (with appropriate electronic circuitry). All these can be arranged to generate a DC voltage proportional to the gamma ray flux which is intercepted by the sensor.

It is understood that the switching from one type sensor to another as accomplished by switch mechanism 95 of FIG. 4A is well within the state of the art, (electronic switching rather than the mechanical switch shown is preferable in most cases). Consequently, in FIG. 5A for reasons for clarity of description, only a single sensor 101 has been shown. Also, the power supply 93 and mud pressure actuated switch 91 of FIG. 4A are not illustrated in FIG. 5A.

In FIG. 5A, the sensor 101 is connected in cascade to A/D convertor 102, processor 103, and power drive 104. The power drive 104 is connected to windings 105 and 106 of the double acting solenoid designated as solenoid 79 in FIG. 4A. The power drive 104 may be similar to that shown by FIG. 3E of the parent application. The operation is as follows: the sensor 101 generates an output electric analog signal as represented by the curve 101a shown on the graph immediately above the sensor rectangle 101. The curve shows the sensor output as a function of the depth of the telemetering transmitter 50 in the borehole. The A/D converter converts the analog signal of 101 into digital form by measuring in succession and magnitude of a large number or ordinates of curve 101a and translating each individual ordinate into a binary number represented by a binary word. This process is well known in the art and requires no explanation here. It is important, however, to realize that whereas graph 101a may represent the variation of the signal from the transducer in a matter of hours the graph 102a represents one single ordinate (for example, AB of the curve 101a). Thus, the time scale of the axis of abscissas on FIG. 102a would be in seconds of time and the whole graph 102a represents one binary 12 bit word, and in actuality represents the decimal number 2649. Thus, each 12 bit word on graph 102a represents a single ordinate such as the ordinate AB on the graph 101a. The usual binary coding involves time pauses between each binary word. After the pause a start up or precursor pulse is transmitted to indicate the beginning of the time interval assigned to the binary word. This precursor pulse is not part of the binary word but serves to indicate that a binary word is about to commence. The binary word is then transmitted which is an indication of the value of an ordinate on graph 101a; then a pause (in time) followed by the next binary word representing the magnitude of the next ordinate, and so on, in quick succession. The continuous curve of graph 101a is thus represented by a series of binary numbers or words each representing a single point on the graph 101a. It is important to understand here that between each binary word there is always a pause in time. This pause (during which no signals are transmitted) is frequently several binary words long, and the pause will be employed for an important purpose which will be explained later in the specification. In order to permit decoding at the surface, the clock No. 1 must be rigorously constant (and in synchronism with a corresponding clock located at the surface), and it generates a series of equally timed spaced pulses in a manner well known in the art of electronics.

The graph 103a represents a single bit of the binary word 102a, and the axis of abscissas here again is quite different from the previous graphs. The time on graph 103a is expressed in milliseconds since graph represents only a single bit. Each single bit is translated into two electric pulses each of time duration $t_x$ and separated by a time interval $t_y$. Graph 104a is a replica of 103a, which has been very much amplified by the power drive 104. Electric impulse 140b is applied to solenoid winding 105 (which is the valve "open" winding), and electric impulse 104c is applied to solenoid winding 106 (which is the valve "close" winding). The valve 40 of FIG. 4A thus is opened by pulse 104b and closed by pulse 104c and, therefore, the valve 40 remains in the "open" condition for approximately the time $t_y$. The times $t_x$ are adjusted to be proper for correct actuation of the solenoid windings and the time $t_y$ is proportioned to open the valve 40 for the correct length of time. Both of these times are determined and controlled by the clock #2.

In telemetering information from a sensor to the earth's surface, I provide appropriate pauses between transmission of successive binary words. Because of these pauses, it is possible to store in an appropriate electronic memory at the surface equipment the noise caused by the drilling operation alone (without the wavelet). The necessary arrangements and procedures for doing this will be described later in this specification.

IV. Description of Hydraulic "Auto-Close" Signalling Valve

I have also provided an arrangement which will operate in case of a malfunction which could occur when the valve is "stuck" in an open position for a long period of time. An arrangement for automatically closing the valve in case of such malfunction (indicated by reference numeral 269 in FIG. 4A) is illustrated diagramatically in connection with FIG. 6A, 6B, and 6C.

As was pointed out earlier in the specification, the valve is designed to have a hydraulic detent or bi-stable action; i.e., when opened by an impulse from the solenoid winding 105 it tends to remain open and later, when closed by an impulse from the solenoid winding 106, it tends to remain closed. It is possible that because of an electrical or mechanical malfunction the valve could become "stuck" in the open position. It should be noted that if such a malfunction occurs the drilling operation can proceed. Some wear would occur at the orifice 81 of FIG. 4A. However, the disturbance to the mud system hydraulics by having the valve open for long periods of time is not desirable; and even though drilling can continue, it is very advantageous to have the valve closed most of the time and opened only to produce the short pulses required to generate the hydraulic shock wave.

Figure 6A:
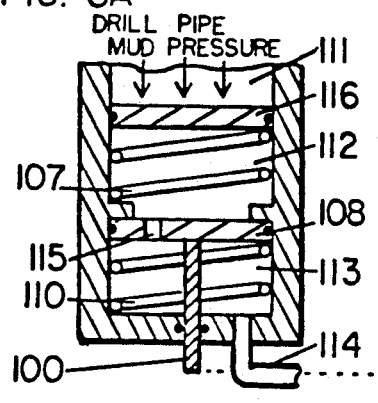
FIGS. 6A, 6B and 6C show diagrammatically the operation of hydraulic "auto close" of the signalling valve.
Figure 6B:
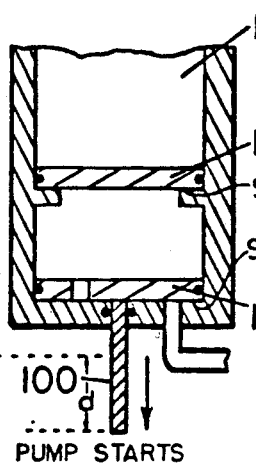
Figure 6C:
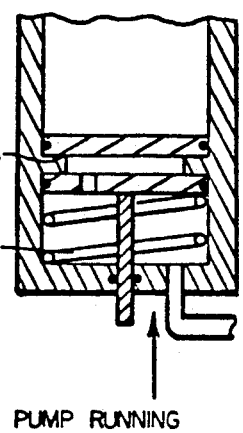

In the diagrammatic drawings of FIG. 6A, 6B, and 6C, the rod 100 is used to push the valve closed by exerting a force downward on the rod 80 of FIG. 4B (the solenoid armature shaft).

Referring now to FIGS. 6A, 6B, 6C, and 6D, the upper end of the mechanism is exposed to "drill pipe mud"; i.e., mud under the hydrostatic pressure plus the differential pressure across the bit; i.e., the difference in pressure between the inside of the tool 50 and the annulus 60. When the pumps are not running, the pressure at the zone 111 is hydrostatic only; and when the pumps are running, the pressure is hydrostatic plus differential. Since the differential pressure is of the order of 1000 to 2000 psi, a large pressure change occurs at the zone 111 when the pumps are started up (i.e., an increase of 1000 to 2000 psi). In FIG. 6A, when the pumps are not running, zones 112, 113 are at annulus pressure because tube 114 is connected to the chamber 84 which contains oil at annulus pressure (see FIG. 4A) and because the orifice 115 interconnects the zones 112 and 113.

Assume now that the pumps are started up. The pressure in zone 111 then increases substantially (i.e., by 1000 to 2000 psi) the pistons 116 is pushed downward compressing the spring 107 (not illustrated in FIG. 6B) and the high pressure oil in zone 112 pushes the piston 108 downward and compresses the spring 110 (not illustrated). Thus, when the pumps are started up, the parts of FIG. 6A change to the configuration of FIG. 6B, and both the pistons 116 and 108 are in the downward position and the rod 100 is extended downwardly as shown.

Now because of the orifice 115 and the action of spring 110, the piston 68 is pushed upwardly with a velocity determined by the size of the orifice 115, the spring constant of spring 110, and the viscosity of the oil in the zones 112, 113. This velocity can be easily controlled and made equal to any desired value; as for example, a velocity such that the piston 108 will return to its original upward location in about 1 minute. Therefore, after one minute the arrangement assumes the configuration of FIG. 6C. For the same reasons, when the pump is stopped the action of the spring 107 and the orifice 115 will cause the piston 116 to rise back to the original condition of FIG. 6A.

It can be seen, therefore, that every time the mud pump is started the rod 100 will move downwards by the distance d as shown in FIG. 6B and then return to the normal retracted position. Since in normal drilling the pump is stopped every time a joint of drill pipe is added, it follows that every time a joint of drill pipe (usually 30 feet long) is added, the rod 100 will make a single downward excursion and then return to its original upward position.

As was pointed out previously, the rod 100 is arranged so that when it is extended downwardly it pushes solenoid armature shaft 80 of FIG. 4A downwardly and closes the valve. Thus, the device of FIG. 6A, 6B, 6C, and 6D is a "safety" device; i.e., should the valve get stuck in the open position because of an electrical or mechanical malfunction, the valve will be forced shut after a maximum of 30 feet of drilling.

Figure 6D:
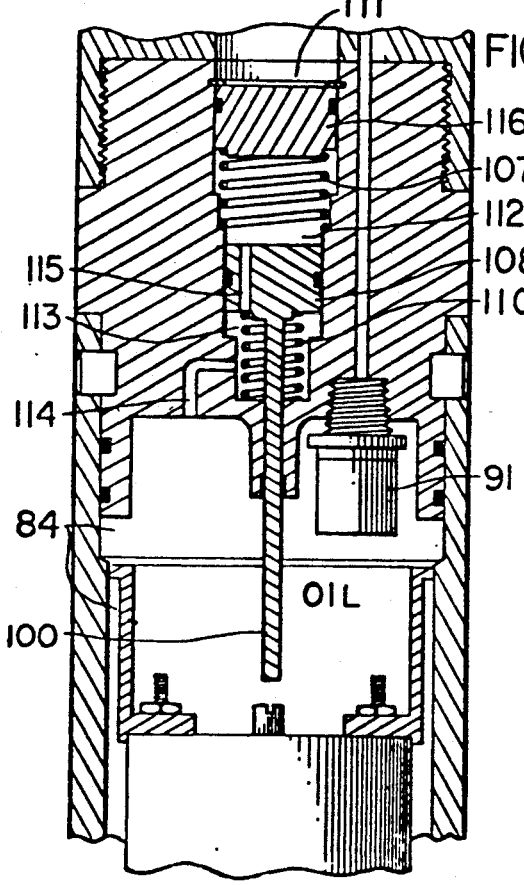
FIG. 6D is an engineering drawing of the arrangement shown in FIGS. 6A, 6B, and 6C.

FIG. 6D shows the engineering drawing of the device diagrammatically illustrated in FIG. 6A, 6B, and 6C. In the actual instrument, the device as illustrated in FIG. 6D is placed in the location 269 of FIG. 4A. Like numbers on FIG. 6D represent the elements having like numbers on FIG. 6A, 6B, 6C, and FIG. 4A.

V. Description of Electronic "Fail Safe" For Signalling Valve

The hydraulic "auto close" system described in connection with FIG. 6A, 6B, 6C, and FIG. 6D will automatically close the valve every time the mud pumps are stopped and restarted, and thus any mechanical sticking of the valve can be remedied. There is a case, however, that requires further attention: If the "close" electric circuitry 103, 109 of FIG. 5A were to fail for any reason (e.g. a burned out solenoid winding) then the valve would reopen electrically, shortly after the hydraulic "auto close" device closed it.

Figure 6E:
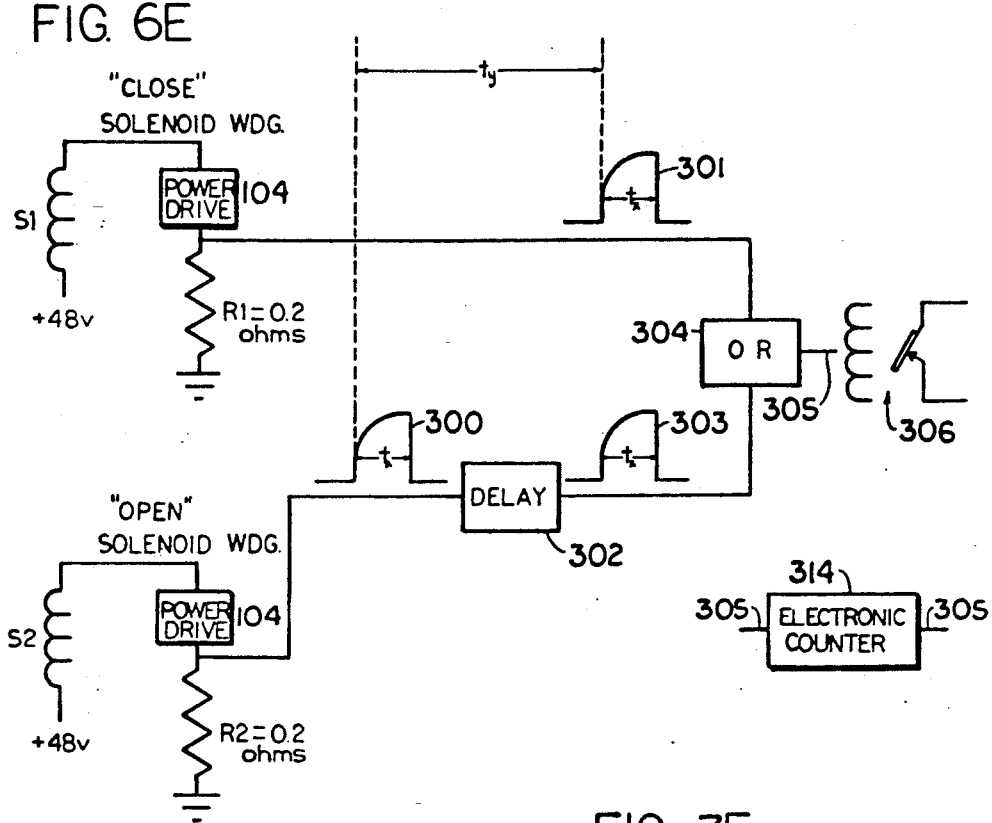
FIG. 6E shows schematically an electronic "fail safe" arrangement applicable to the signalling valve.
Figure 7F:
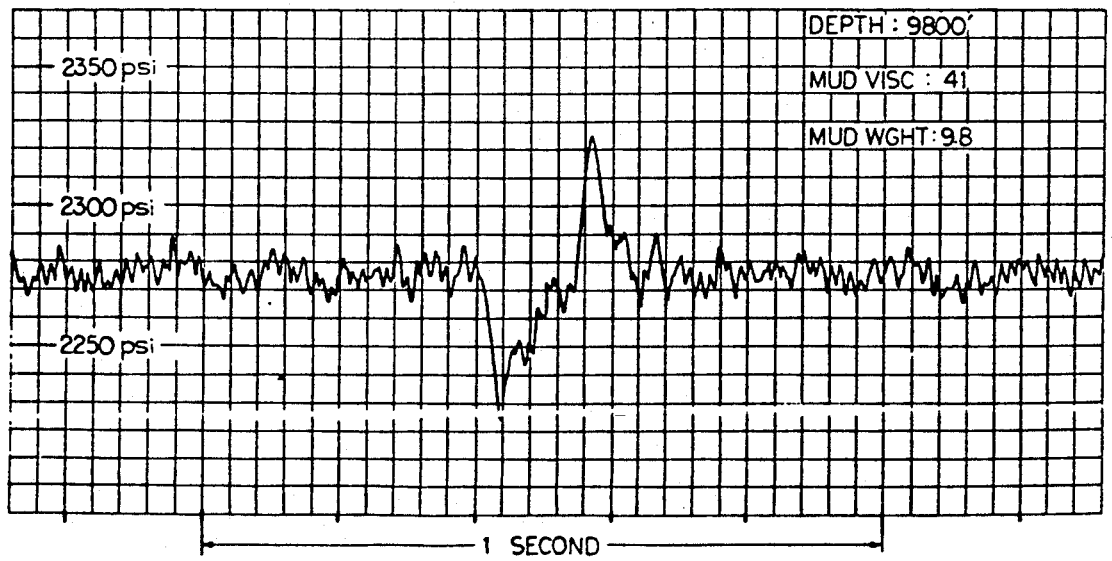
FIG. 7F shows an exact reproduction of the pressure signal showing a valve wavelet as received at the surface from the depth of 9,800 feet at an actual oil well being drilled in East Texas.

FIG. 6E shows an electric system that will inhibit operation of the valve in case of an electrical failure in the downhole apparatus. $S_1$ designates the winding of the solenoid that "closes" the valve and $S_2$ the winding of the solenoid that "opens" the valve. The resistor $R_1$ is connected in series with the portion of the solenoid drive 104 which actuates the "close" solenoid winding $S_1$. The resistor $R_2$ is connected in series with the portion of the solenoid drive 104 which actuates the "open" solenoid winding $S_2$. These resistors are of very low ohmic value (about 0.05 to 0.2 ohms). It is understood that the operation of the system described in detail with respect to FIG. 5A in this specification is as follows: The "open" electric current pulse is generated first and is shown diagramatically in FIG. 6E as the pulse 300; the "close" electric current pulse is generated later (after a time $t_y$) and is shown diagramatically at 301 in FIG. 6E. It must be noted that these electric pulses 300 and 301 represent the current drawn by the solenoid windings and not the voltage applied (the resistors $R_1$ and $R_2$ generate voltage drops $R_1i_1$ and $R_2i_2$, and $i_1$, $i_2$ indicate the currents through the respective solenoid windings); consequently, if one f the windings $S_1$ or $S_2$ is burned out or open circuited, no current will flow and no corresponding pulse will be produced (similarly, any other electrical failure will cause no current to flow through one or both of the resistors $R_1$, $R_2$).

The magnitude of the time $t_y$ of FIG. 6E and the length of the time $t_x$ has been explained and defined previously in this specification in connection with FIG. 5A.

The delay of the delay element 302 is equal to $t_y$. In other words, block 302 produces at its output a pulse, identical to the input pulse but delayed by the Time $t_y$. Such delay systems are well known and need no description here.

Since the delay of element 302 is equal to $t_y$, the pulse as shown by 303 will be in time coincidence with the pulse 301.

304 is an anti-coincidence circuit (also known as an OR gate) and produces at its output 305 an electric signal only when one of the pulses 301, 303 is impressed on it, but produces no output when both pulses 301 and 303 are present. 306 is a relay actuated by the signal on lead 305 and is arranged to disconnect the power to the downhole tool. Thus, if only a "close" pulse is present (without the "open" pulse) or if only an "open" pulse is present (without the "close" pulse), the power to the downhole power drive is disconnected then be closed mechanically by the "auto closed" hydraulic system described in connection with FIG. 6D.

As an alternate arrangement in FIG. 6E, the relay 306 (which of course can be an electronic switch comprising transistors) can be arranged to interrupt the power only to the circuitry for the "opening" solenoid. This would have certain advantages because the "closing" circuitry will continue to function, and one of the objectives is to insure the "closing" of the valve. Furthermore, an electronic counter 314 may be interposed between the "OR" circuit and the relay circuit 306 so that a single electric malfunction will not disconnect the power. The power will then be disconnected only after, for example, 2, 4, or 8 successive malfunctions.

VI. Description of Automatic Cut-Off For Signalling Valve Power Drive

Figure 5C:
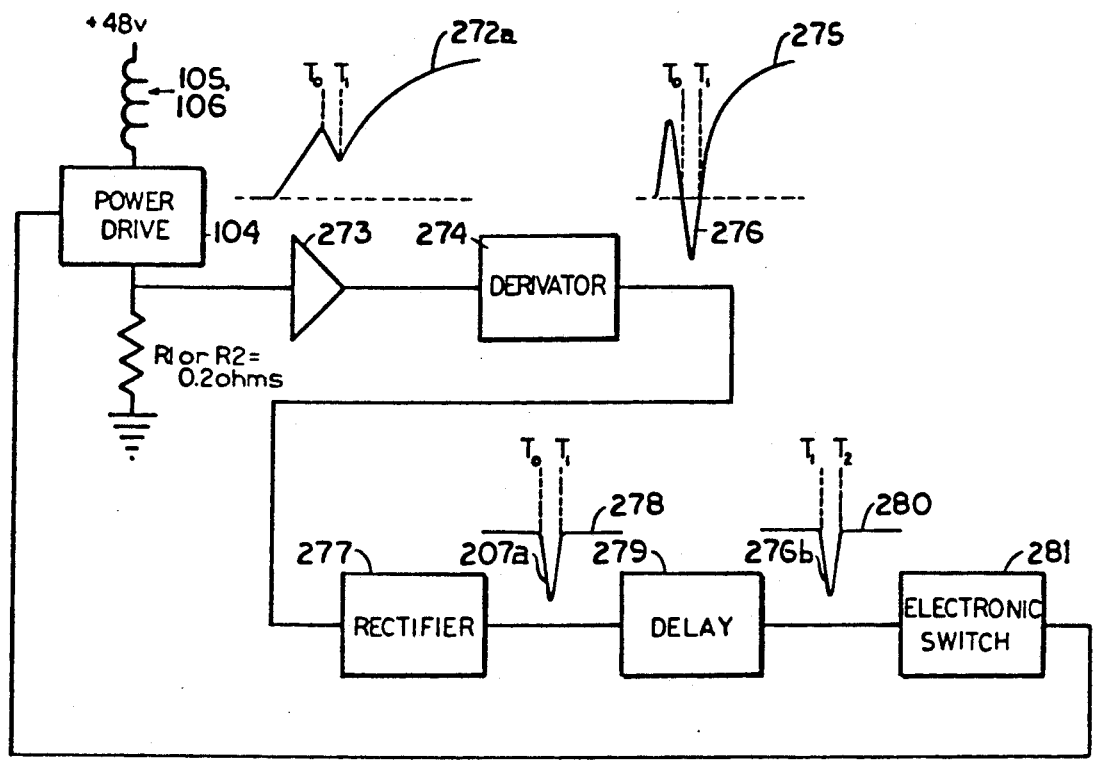
FIG. 5C shows schematically electronic circuitry which may be utilized to accomplish automatic cut-off of the power drive for the valve of the special telemetry tool.

As has been pointed out previously in this specification, very fast operation of the valve 40 of FIG. 4A is important. The requisite shock wave will not be produced if the valve operation is slow. Since the valve and its drive mechanism contain considerable mass, substantial power is necessary to open or close the valve in the time that is considered desirable. This power is of the order of ½ to ¾ horsepower section IV hereof. As in all designs of this nature, a margin of power is required in order to be sure that the valve always opens or closes upon command. The various electronic "logic circuits" and "power drive circuits" shown in FIG. 5A are designed to provide rectangular voltage pulses 104b and 104c and have a duration of about 40 to 50 milliseconds in order to make sure that the solenoid windings 105 and 106 are energized for a sufficient time to ensure the operation of the valve. FIG. 5E shows the voltage pulse 104b of FIG. 5A in greater detail. At the time 0 the voltage is suddenly applied by the power drive 104 and rises almost instantaneously to the value shown by numeral 270, remains at this voltage value for 50 milliseconds, and then is cut off and falls (again almost instantaneously) to the value 0.

Figure 5D:
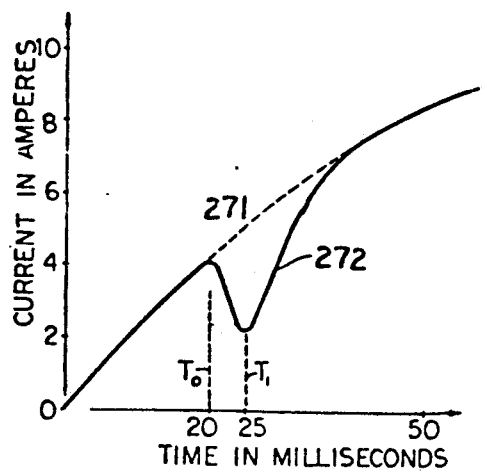
FIG. 5D and 5E are graphs to aid in the explanation of the automatic cut-off for the signalling valve power drive.
Figure 5E:
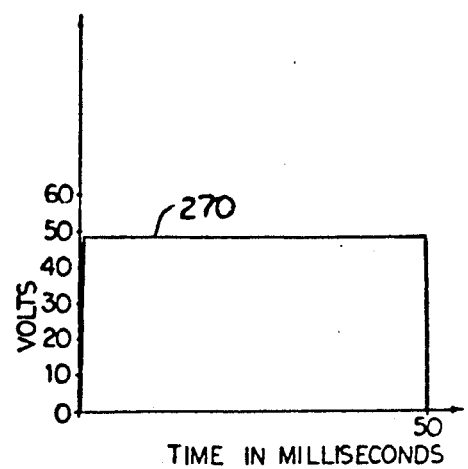

It is very informative to study the motion of the valve by making measurements of the current flow into the solenoid drive winding and constructing a graph (see FIG. 5D). From such a graph, the behaviour of the valve can be quantitatively studied. FIG. 5D shows such a graph in the form of an oscillogram of the current versus time. (This current is measured, for example by the voltage across resistor $R_1$ or $R_2$ of FIG. 6E.)

It is important to understand that it is the current through the solenoid winding that determines the force upon the valve stem 68 of FIG. 4A, since ampere turns determine the electromagnetic pull. Since the windings of the solenoid have inductance, the current will not build up instantaneously when a sudden voltage is applied as in FIG. 5E. If the solenoid comprised a simple inductor, then the current would build up according to simple exponential curve 271 of FIG. 5D as shown by the dotted curve. In actuality something quite different occurs: When the valve actuates (opens or closes) there is a sudden motion of the armature of the solenoid 79 of FIG. 4B and a back e.m.f. is generated. This back e.m.f. is caused by the velocity of the armature that quickly changes (increases) the inductance of the pertinent coil of the solenoid 79. In FIG. 5D, 271 shows the approximate current versus time curve in the solenoid winding when the armature of solenoid 79 and the valve stem 68 is "blocked" in the "open" or "closed" condition. The solid curve 272 in FIG. 5D shows the actual current buildup when the valve is not blocked; i.e., in actual working condition (opening or closing). The curves 272 for opening or closings are very similar. It is seen that curve 272, after the application of the voltage, gradually rises (since the respective solenoid col 105, 106 has inductance) until it reaches, in the example shown, the value of 4 amperes at the time T. which is 20 milliseconds. Then there is the sudden drop of current that reaches the lower value of 2.2 amperes at the time $T_1$ which is 25 milliseconds. After the $T_1 = 25$ milliseconds, the current again increases according to the familiar "exponential" until it reaches, assymptotically, the value of about 10 amperes at the time of approximately 60 milliseconds (this value is determined by the resistance of the solenoid winding which in the example given is about 4.7 Ohms).

From a study of the curve 272 in FIG. 5D, it will become apparent that the valve 40 starts opening or closing at the time $T_0 = 20$ milliseconds and completes the motion at the time $T_1 = 25$ milliseconds. As was pointed out previously, an almost identical situation occurs during the "opening" or the "closing" of the valve; and the curve 272 would indicate that at the time $T_0 = 20$ milliseconds the valve starts its motion, and at the time $T_1 = 25$ milliseconds the motion is completed.

It is important to note that the time $T_1 = 25$ milliseconds on FIG. 5D is given as a typical example, and $T_1$ depends on a number of factors. Thus, a high differential pressures $T_1$ will be greater than 25 milliseconds and could be 30, 35 or 40 milliseconds. Suffice it to say that the time $T_1$ on FIG. 5D indicates the time when the valve actuation has been completed, and the current between the times $T_1$ and 50 milliseconds is in effect "wasted" since the actuation of the valve has already been completed. This extra time is a "safety factor" to ensure that, even under adverse conditions, the valve will always be actuated when the voltage pulse is applied.

In accordance with my invention I use the signal at the time $T_1$ to turn off any further current to the solenoid 79. Consequently all the current between the time $T_1$ and 50 milliseconds will be saved (thus reducing very substantially the total amount of energy required to operate the valve 40). It must be noted that the full "safety factor" referred to above is maintained; the current will continue to be applied until the valve has completed its (opening or closing) operation.

The electronic circuitry that is employed to accomplish the above objective is shown by FIG. 5C, wherein 104 indicates the power drive of FIG. 4A. Between the power drive 104 and ground is interposed a resistor ($R_1$ or $R_2$) of low value (compared to the resistance of the solenoid) for example 0.2 ohms. The voltage across this resistor is, therefore, proportional to the current fed to the particular solenoid winding 104, 106. (Two circuits as shown in FIG. 5C are necessary—one for the opening solenoid power drive, but for simplicity of illustration, only one circuit is shown in FIG. 5C.) 273 is a conventional amplifier and at its output the voltage curve 272a of FIG. 5C will be a replica of the curve 272 in FIG. 5D. 274 is a derivator (well known in the electronics art) which generates an output voltage proportional to the first time derivative of its input voltage. Curve 275 shows this derivative voltage. It can be seen from observing curve 272 or 272a that the derivative (slope) of the curve is always positive except during the times between $T_0$ and $T_1$, during which time the slope (derivative) is negative. On the curve 275 only the impulse 276 is negative. 277 is a conventional receifier arranged to pass only the pulse 276, as shown on the graph 278. 279 is an electronic delay circuit (also well known in the art) which generates an output pulse 276b which is a replica of the input pulse but delayed by the time $T_1 - T_0$. Thus, the pulse 276b as shown in graph 280 occurs slightly later than the time $T_1$. This pulse 276b is applied to an electronic switch 281 that is arranged to cut off the power to the power drive 104, thus stopping the current flow almost immediately after the valve 40 has completed its operation (opened or closed). The electronic switch 281 is arranged to restore the action of power drive 104 after an appropriate time. The process repeats itself when the next impulse 104a (or 104b) occurs.

It is important to note that the saving in energy that can be achieved by utilizing this aspect of my invention can be very substantial. Since very large powers are required to operate the valve 40 with the great speed required, this saving is very significant, and it could in the example shown increase the battery life by as much as 5 times.

VII. Optimum Conditions for Determining the Regime of Hydraulic Shock Waves (Determination of Parameters $K_1$ (or $K_2$) and $T_b^{(v)}$)

I have performed a series of experiments in order to determine the optimum conditions for the regime of hydraulic shock waves.

The occurrence of a hydraulic shock wave is analogous to that of the water hammer effect. By suddenly stopping the flow in a localized region in the line of flow, we suddenly increase pressure in that region. This initially localized increase in pressure propagates itself along the line of flow as "water hammer". It is well known that a sudden and localized change (decrease or increase) suddenly produces a corresponding localized change (increase or decrease) in pressure, and conversely, a sudden and localized change in pressure produces a sudden and localized change in velocity. Because of elasticity and inertia of the fluid, the change is being transmitted further from the volume element where it originates to neighboring volume elements with a velocity which is the velocity of propagation of compressional waves. The problem of propagation of shock waves is of extreme complexity. To satisfy practical requirements, we need to determine a parameter which will be the most representative from the standpoint of obtaining a clearly defined shock wave. Two parameters will be considered which we designate as parameter $K_1$ and parameter $K_2$. When either of these parameters exceeds an appropriate value, a clearly defined shock wave is produced.

(a) Parameter $K_1$

This parameter is the mean rate of change of the velocity of mud flow through the bypass valve during the period of opening (or closing) of the valve:

Let $V(t)$ be the velocity of the mud flow through the bypass valve as it varies with time (in cm/sec. or feet/sec.). At the instant $t=0$ when the valve begins to open, the velocity is zero; i.e., $V(0)=0$. At the instant $t=T_a^{(v)}$ when the valve is fully open, the velocity of the valve attains a certain value $V_f$ which is the bypass velocity during the period of full flow. Thus, $$V(T_a^{(v)}) = V_f \tag{10}$$

Consequently the parameter $K_1$ which is mean rate of change of the velocity during the period $T_a^{(v)}$ is $$K_1 = \frac{V_f}{T_a^{(v)}} \tag{11}$$

$K_1$ is measured in cm/sec$^2$.

We assume that when $K_1$ exceeds an appropriate threshold value; i.e., when $$K_1 > M_1 \tag{12}$$

we obtain a clearly defined shock wave. In the experiments performed it was determined that $$M_1 \approx 2 \times 10^5 \text{ cm/sec}^2 \tag{13}$$

(b) Parameter $K_2$

This parameter represents the mean rate of change of the area of the opening of the valve during the period $T_a^{(v)}$.

We previously defined (see equation (1)) $S(t)$ as the area of the valve which is open at the time t. Thus, at $t=0$ one has $S(0)=0$ and at $t=T_a^{(v)}$ one has $$S(T_a^{(v)}) = S_0 \tag{14}$$

where $S_0$ is the total opening of the valve. The parameter $K_2$ is $$K_2 = \frac{S_0}{T_1^v} \text{ cm}^2/\text{sec.} \tag{15}$$

We assume that when $K_2$ exceeds an appropriate threshold value; i.e., when $$K_2 > M_2 \tag{16}$$

we obtain a clearly defined shock wave. In experiments performed, it was determined that $M \simeq 100$ cm²/sec.

Roughly speaking, $K_1$ is proportional to $K_2$. The parameter $K_2$ is perhaps more useful because it tells us directly how to design and operate the valve.

Figure 2A:
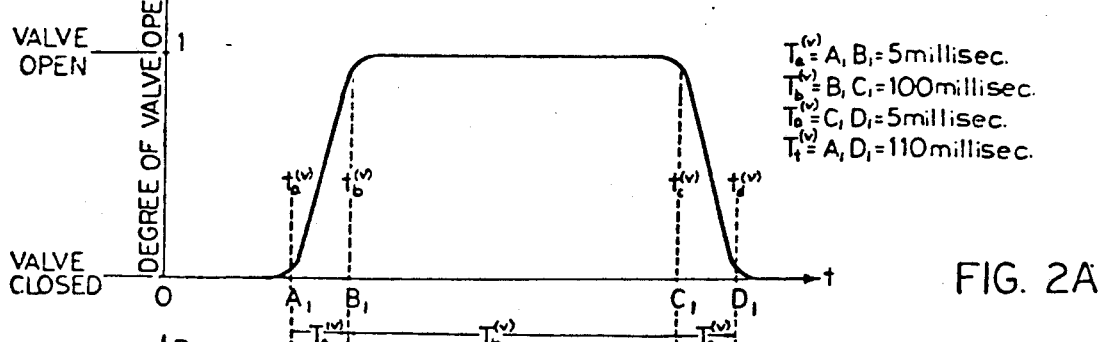

There is also a parameter $T_b^{(v)}$ (see $B_1C_1$, in FIG. 2A) which needs to be considered in the discussion on FIG. 7A to 7E. Each of these figures corresponds to a set of numerical values of $K_1$ and $T_b^{(v)}$ or $K_2$ and $T_b^{(v)}$.

FIG. 7A to 7E show the effect of varying $K_1$ and $T_b^{(v)}$ or $K_2$ and $T_b^{(v)}$ in effecting the transition from the regime of slow pressure variation to the regime of hydraulic shock waves. More specifically each of these figures show how the pressure detected and the earth's surface (ordinate) varies with time, t (abscissa). The size of the orifice was 0.5 cm² in these experiments. Experimental data were obtained at a number of wells. These wells were selected in Oklahoma, West Texas, East Texas and in the Netherlands. Moreover, some of the tests were made on an "experimental well" that was explicitly drilled to perform telemetry experiments.

In performing the above experiments, account was taken of the great variety of existing mud pump installation and of various interfering effects. There are many kinds of mud pumps: Single Duplex, Double Duplex, Single Triplex, Double Triplex, and the pump pressure variations for a given average mud pressure vary a great deal from installation to installation. Elimination of the large interfering mud pressure signals is complex. The pump pressure signals from a single Duplex System can be 10 or even 20 time larger than those from a carefully adjusted Double Triplex. For determination of the optimum values of $K_2$ (or $K_1$) and of $T_b^{(v)}$, the drilling operation was stopped and a very good (smooth) Tiplex pump was used. Thus, graphs in FIGS. 7A to 7E are not representative of a typical condition but represent a condition where the various noises (from the pumps and other sources) were minimized and then averaged out by calculation and drafting in order to obtain optimum values for the parameters $K_2$ (or $K_1$) and $T_b^{(v)}$. The corresponding values of $K_2$ (or $K_1$) and $T_b^{(v)}$ for each of FIGS. 7A to 7E are given in the table which follows:

TABLE

|  | $K_2$ (in cm²/sec) | $T_b^{(v)}$ (in seconds) |
|---|---|---|
| FIG. 7A | .5 | 2 |
| FIG. 7B | 2.5 | 1 |
| FIG. 7C | 8.5 | 0.5 |
| FIG. 7D | 2.5 | 0.25 |
| FIG. 7E | 100 | 0.1 |

The graphs of FIG. 7A to 7E represent average numbers obtained in a large number of tests. In these tests the normal standpipe pressure was 3000 psi and variations of pressure were in a range of 100 psi. The above tests were made using various types of valves: motor driven, rotary, poppet, etc. FIG. 7F is an exact replica of the standpipe pressure recorder chart obtained in tests conducted at 9800 feet with standpipe pressure 2800 is and performed in an actual drilling of an oil well in West Texas.

Figure 1A:
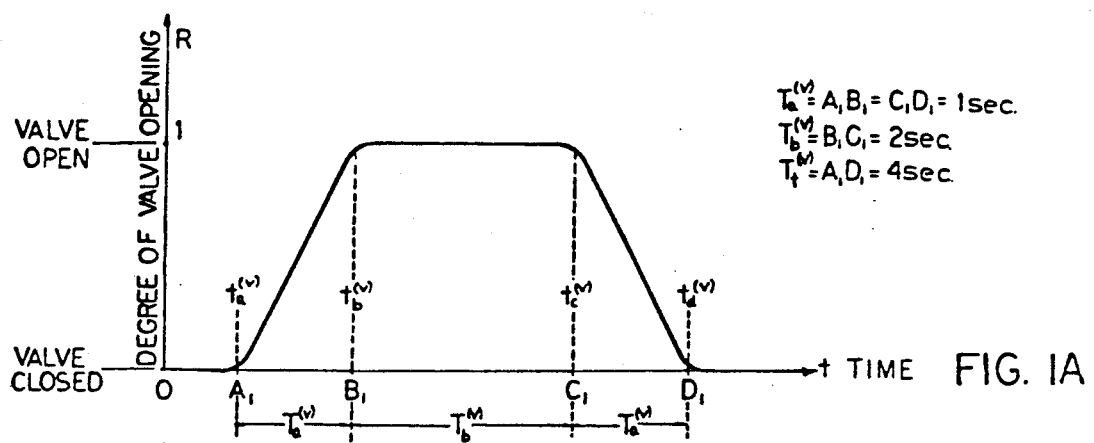
FIGS. 1A, 1B, 2A and 2B are graphs which relate in part to the portions of the specification entitled "Field of the Invention" and "Description of the Prior Art". The remaining figures, as well as FIGS. 1A, 1B, 2A, and 2B relate to the portions of the specification entitled "Summary of the Invention" and "Description of the Preferred Embodiments".
Figure 1B:
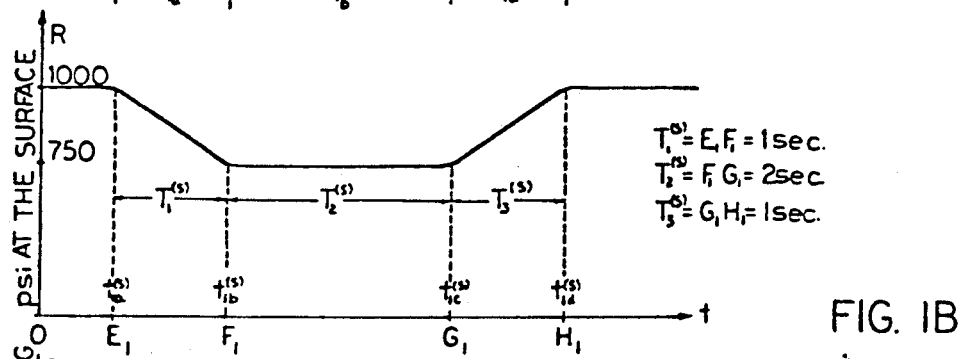
Figure 2B:
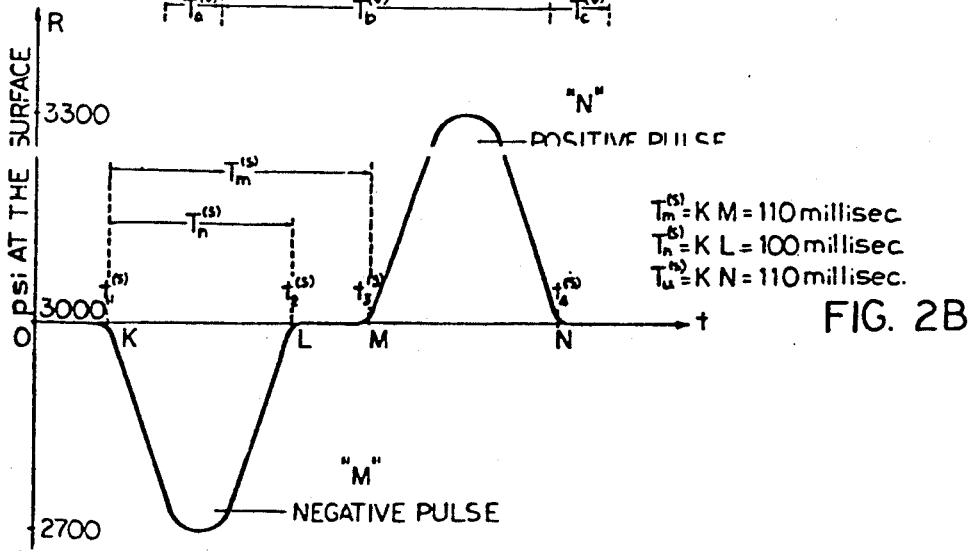

The graph in FIG. 7A was obtained by using a slow acting valve. The numerical values of the pertinent parameters in FIG. 7A were $K_2=0.5$ cm²/sec and $T_b^{(v)}=2$ sec; i.e., they were similar to those suggested in the prior art as in FIGS. 1A and 1B. Consequently, both FIG. 7A and FIG. 1B represent the regime of slow pressure pulsation. On the other hand, FIG. 7E was obtained using a fast acting valve for which $K_2=100$ cm²/sec and $T_b^{(v)}=10^{-1}$ seconds. Consequently, FIG. 7E represents the regime of hydraulic shock waves and the valve wavelet in FIG. 7E is very similar to the valve wavelet in FIG. 2B.

FIGS. 7B, 7C, and 7D as defined in the table above show the transition from the regime of slow variations of pressure to the regime of hydraulic shock waves.

In the tests shown in FIGS. 7B, 7C, and 7D the conditions were kept as similar as possible. The instrument was located near the bottom of drill holes of depth of about 8000 feet, the mud velocity was about 40 Funnel, and the weight 12 pounds per gallon. The valve when "open" had an effective open area of 0.7 cm². The normal standpipe pressure was 3000 psi and the valve used in these tests was similar to the valve 40 but modified to permit slower action (without the bi-stable action); i.e., the valve was a simple pressure balanced valve, and the flow rate was controlled by a restriction at the inlet passageway. It should be noted that the valve action which accounts for FIG. 7B was quite fast, but it did not produce the desired regime of hydraulic shock waves. The sharp onsets, however, indicated that faster action is desirable. The discharge rate was of the order of 5 gallon/sec².

By adjusting the inlet restriction and the outlet restriction and the electric power supplied to the drive solenoids, various valve operation speeds were obtained.

It is seen from the above that no shock waves are produced when $K_2=0.5$ cm²/sec, and an almost ideal shock wave is produced when $K_2=100$ cm²/sec.

VIII. Obtaining Shock Waves to Override Noise (Alternative Version)

It will introduce another parameter which will express a requirement regarding the intensity of the shock wave. Two different approaches will be considered. One of these is based on a parameter $K_3$ which represents the amongst of mud (measured in cm³ or in gallons) which passed through the valve during the period $T_a^{(v)}$ (This quantity is known as influence). The other approach is based on a parameter $K_4$ which represents the average flux of the mud stream during the period $T_a^{(v)}$. Thus, $$K_4 = \frac{\text{amount mud passed during } T_a^{(v)}}{T_a^{(v)}} \quad (17)$$

Considered the period of opening of the valve; i.e., the period $T_a^{(v)}$. To simplify the problem we assume that the rate of increase of the velocity of flow during the period $T_a^{(v)}$ is constant and is equal to $K_1$. Thus, $$V(t) = K_1 t \text{ in cm/sec} \quad (18)$$

Assume also that the rate of increase of the opening of the valve is constant, and equal to $K_2$. Thus, $$S(t) = K_2 t \text{ in cm}^2/\text{sec}. \quad (19)$$

Consequently the volume that passes through the valve during the time $T_a^{(v)}$ is $$K_3 = \int_0^{T_a^{(v)}} K_1 K_2 t^2 dt = \frac{(K_1 K_2 T_a^{(v)})^3}{3} \text{ cm}^3 \quad (20)$$

Thus, parameter $K_3$ is the amount in cm³ of fluid that passed through the valve during the period $T_a^{(v)}$. This is the amount of influence for the period of a single opening and closing of the valve. Another alternative is to take instead of the parameter $K_3$ a parameter $K_4$ representing the flux for the period $T_a^{(v)}$; i.e., $$K_4 = \frac{K_3}{T_a^{(v)}} \quad (21)$$

IX. Additional Notes

In order to obtain the shock waves described earlier in this specification, there are certain limits imposed on $K_2$ (mean rate of change of the opening of the valve) and on $T_b^{(v)}$ (the time of open flow). Experiments have shown that $K_2$ should be at least 5 cm²/sec. and preferably within the range from 20 cm²/sec. to 150 cm²/sec. $T_b^{(v)}$ should be at most 500 milliseconds and preferably be in the range from 50 milliseconds to 150 milliseconds.

I have described in the first part of this specification the conditions for occurrence of hydraulic shock waves and related "valve wavelets" in some detail. At some depths, for example shallow depth, conditions can rise when the valve wavelet as described above is not well formed. For such a valve wavelet it is necessary to have sufficient volume of mud flowing in the drill pipe and sufficient hydrostatic pressure at the transmitter end. It should be clearly understood that my invention is not limited to the particular wavelet shown and is applicable to other forms of pressure pulses which can be detected at the earth's surface as a result of the actuation of the valve 40.

What is claimed:

1. Apparatus for transmitting data to the surface of the earth in a borehole having therein a tubular drill string and a drilling device dependently coupled thereto, said drill string providing a flow passage for circulating a stream of drilling fluid between the surface of the earth and said drilling device, said apparatus comprising:

sensor means in said drill string for producing electrical signals indicative of at least one downhole condition;

pressure signalling means in said drill string and responsive to said electrical signals for producing pressure signals within said circulating fluid;

a valve within said pressure signalling means interposed in at least a part of said stream, the valve being moveable between a closed and an open condition;

a first force means within said signalling means for urging said valve from said closed toward said open condition in response to said electrical signals;

a second force means within said signalling means for moving said valve toward a more fully open condition, the force of said second force means being applied in addition to the force of said first force means, the opening of said valve creating a negative pressure wave in said drilling fluid in said drill string; and a receiver at the surface of the earth for receiving said negative pressure wave.

2. An apparatus according to claim 1 wherein said valve is moved from said closed to said open condition at a rate that produces a negative hydraulic pressure shock wave.

3. An apparatus for transmitting data to the surface of the earth from near the bottom of a borehole having therein a tubular drill string and a drilling device dependently coupled thereto and an annulus area within said borehole exterior of the drill string, said drill string providing a flow passage for circulating a stream of drilling fluid from the surface of the earth through said drilling device and back to the surface through said annulus, said drilling device providing a restriction to the flow of drilling fluid and as a consequence thereof providing a high pressure zone within said drill string and a low pressure zone within said annulus area, said apparatus comprising:

sensor means in said drill string for producing electrical signals indicative of at least one downhole condition;

pressure signalling means in said drill string and responsive to said electrical signals for producing pressure signals within said circulating fluid;

a fluid passageway in said signalling means and interconnecting said high pressure zone and said low pressure zone;

a valve within said passageway, said valve being moveable between a closed and an open condition;

a first force means within said signalling means for moving said valve from said closed toward said open condition in response to said electrical signals;

a second force means within said signalling means for moving said valve to said open condition, said second force means being applied in addition to said first force means, such opening of said valve creating a negative pressure wave in said drilling fluid in said drill string; and a receiver at the surface of the earth for receiving said negative pressure wave.

4. A tool positionable in a well for transmitting information by use of fluid pressure pulses, the tool having an electrical signal generator responsive to measured physical characteristics, the tool having a first port exposed to high fluid pressure and a second port exposed to lower fluid pressure, and a fluid passageway therein between the first and second ports, the tool having a pressure signal generating apparatus therein, comprising:

a valve seat in said fluid passageway;

an orifice in said fluid passageway between said valve seat and said lower pressure port, the orifice serving to create a zone of reduced fluid pressure within said tool;

a valve stem movable between a closed condition with said seat to close fluid flow therethrough, and an open condition in which fluid flow is permitted through said seat and said orifice; and means to move said valve stem from said closed condition to said open condition by the application of an electrical force and a hydraulic force applied in sequence, the hydraulic force being derived from said zone of reduced fluid pressure, said electrical force being applied in response to said signal generator.

5. A tool according to claim 4 wherein a second orifice is provided in said second port and said second orifice is severably connected to said tool and can be changed in order to adjust the fluid flow through said passageway.

6. A tool positionable in a well for transmitting to the surface downhole information by use of fluid pressure signals generated in the well circulating fluid having therein an electrical sensor responsive to a measured physical characteristic, said tool having a first port exposed to higher fluid pressure and a second port exposed to lower fluid pressure, and a fluid passageway between said first and second ports through which at least part of said circulating well fluid flows through said first port and then through said second port, comprising:

- a valve having a valve stem and a valve seat in said fluid passageway;
- a first orifice member in said passageway following said valve seat and a second orifice member following said first orifice member in said passageway, said orifice members serving to create a zone of reduced fluid pressure caused by the flow of well fluid through said passageway, said valve stem being movable between a closed condition with said seat to close fluid flow therethrough and an open condition in which fluid flow is permitted through said seat and said two orifices members; and
- means to move said valve stem from said closed condition to said open condition by the application of an electromagnetic force and a hydraulic force applied in sequence, the hydraulic force being derived from said zone of reduced fluid pressure, said electromagnetic force being applied in response to said electrical sensor.

7. A tool according to claim 6 wherein said hydraulic force is produced by a hydraulic actuated piston means comprising said valve stem and acted upon by differential fluid pressure created in part by said zone of reduced fluid pressure.

8. The tool according to claim 6 in which said first orifice member is severably connected to said tool.

9. The tool according to claim 6 in which said second orifice member is severably connected to said tool.

* * * * *